United States Patent Office 3,438,441
Patented Apr. 15, 1969

3,438,441
ELECTROLESS METAL BONDING OF UNCONSOLIDATED FORMATIONS INTO CONSOLIDATED FORMATIONS
Edwin A. Richardson, Houston, Tex., assignor to Shell Oil Company, New York, N.Y., a corporation of Delaware
No Drawing. Continuation-in-part of application Ser. No. 579,223, Sept. 14, 1966. This application Dec. 22, 1967, Ser. No. 692,670
Int. Cl. E21b 33/13, 43/22; C23c 3/00
U.S. Cl. 166—292
10 Claims

ABSTRACT OF THE DISCLOSURE

A method of consolidating an incompetent formation having a temperature not greater than 125° F. by metalizing or metal plating the formation by an electroless metal plating process using a basic metal plating solution.

CROSS-REFERENCE TO RELATED APPLICATION

This application is a continuation-in-part of copending patent application Ser. No. 579,223, filed Sept. 14, 1966, now Patent No. 3,393,737.

BACKGROUND OF THE INVENTION

This invention relates to treating incompetent or unconsolidated formations such as unconsolidated subsurface formations and more particularly to treatment of loose or incompetent earth formations surrounding well bores so as to consolidate said formations into permeable, thermally and hydrolytically resistant consolidated formations for improved and efficient recovery of fluids therefrom.

It is well known that many difficulties are encountered in producing or recovering fluids from incompetent earth formations due to collapsing or sloughing of the well bore walls. Numerous means have been employed to alleviate this and among the methods and devices used to prevent collapsing and sloughing of unconsolidated formations is the use of perforated pipe liners, gravel packing or tubular screens or by injecting resin forming materials such as phenol-formaldehyde resins or epoxide resins which function as bonding and consolidating agents for weak formations. Another method employed involves subjecting the incompetent formations to elevated temperatures so as to cause fusion of constituents therein, e.g., silica sand particles, to provide bonding agents. Still another means is to form carbonized or coked materials which act as binders to hold the formation as an integral consolidated mass. Essentially these methods and means for consolidating incompetent earth formations have serious limitations as, for example, the mechanical devices mentioned tending to become plugged and generally are incapable of preventing fine particles from entering the production well. Also, these devices require cleaning and constant attention. The use of resin consolidating materials requires special equipment and a treatment process necessitating the presence of a drilling rig and the process is generally time consuming and costly. In essence the same applies to thermal means of consolidating formations as mentioned above or other similar means known to the art. Thus, conventional thermal and chemical means of consolidating loose or incompetent formations are generally inefficient, ineffective, costly and generally cause a decrease in permeability of the formation, and they lack desired resistance to changes in stresses, strains, pressure and temperature conditions normally encountered in producing effluent from such formations.

An object of the present invention is to provide an improved method of consolidating loose or incompetent subsurface formations.

Another object of the present invention is to consolidate loose formations with a metallic binding agent which is resistant to hydrolysis and is capable of withstanding great pressures, strains and stresses.

Still another object of the present invention is to bind the grains of loose formations, at temperatures not greater than about 125° F., with a metallic binding agent which is resistant to corrosion and is not effected by hot fluids such as water, steam and the like and is also resistant to high thermal temperatures caused by combustion drives and the like.

Still another object of the present invention is to form a metallic consolidated subsurface earth formation having good permeability and good compressive strength, for the recovery of hydrocarbon fluids therefrom particularly when using thermal drives such as hot water or steam in the recovery process.

Still another object of this invention is to metalize formations so as to consolidate them and protect natural cementation materials against dissolution, particularly at high temperatures.

Still other objects and advantages will be apparent from the description and examples illustrating the present invention.

SUMMARY OF THE INVENTION

It has now been discovered that incompetent formations in which temperatures of less than about 125° F. are encountered and which are generally penetrated by wells, can be effectively consolidated by penetrating such formations with a basic electroless metal-deposition solution capable of plating (at a controlled reaction rate), on the unconsolidated sand grain particles, a metal coating which protects and binds together the grains of the formation into a permeable consolidated form. The electroless metal-deposition and consolidation of the formations is effectively accomplished by first penetrating an unconsolidated formation with an activator fluid capable of activating or catalyzing the grains of the formation, and thereafter contacting the activated or catalyzed formation with a basic metal-deposition solution containing chemicals inclusive of polyvalent metal ions and a reducing agent, and effecting a chemical-reduction deposition of metal within the formation.

In consolidating oil-bearing loose formations having reservoir temperatures of not greater than 125° F. for the recovery of hydrocarbon fluids therefrom by means of wells completed therein, it is preferable that prior to penetrating such formations with an activator and basic metal-deposition solution as mentioned above, that such formations be pretreated with an acidizing fluid and/or preflushing fluid so as to displace oil and connate-water in areas desired to be consolidated by injecting therein suitable acidizing solutions and/or preflushing solvents. During the activating of the components of loose formations, e.g., fine and/or coarse sand particles, by an activating or catalyzing solution and the subsequent consolidation of the formations with a basic metal-deposition solution, the solutions can be injected into the loose formations with or without spacer fluids between them. It is preferable that the formations be pretreated with a suitable acidizing solution or solvent, prior to penetrating the loose formations with the catalyzing or activator fluid, followed by displacing the activator fluid with an inert fluid such as air or water or by a liquid composition containing a reducing agent and finally metal coating the loose formations with a basic metal-deposition solution by electroless means as will be fully described below.

Metals deposited by the process of this invention on loose sand grains in unconsolidated earth formations from excellent binding agents which consolidate the loose sand grains into stable permeable integral formations capable of sustaining great compressive forces and resisting damage to the formations caused by thermal drives. Also, the metal coatings on the grains form impermeable layers that protect the grains from destruction by hot fluids such as hot water and/or steam. The metal coatings of siliceous components in earth formations also prevents dissolution of the silica that is contacted by hot aqueous fluids when such fluids are flowed through the earth formations, for example, in recovery of hydrocarbon fluids therefrom.

An unconsolidated mass of sand grains is consolidated by the process of this invention by impregnating the mass first with an activator liquid and then with a basic metal-deposition solution containing chemicals inclusive of metal ions and a reducing agent so as to chemically deposit within the mass a metal coating which consolidates the mass. The amount and disposition of the deposited metal are sufficient to bind the sand grains into a consolidated mass capable of sustaining compressive forces of many hundreds of pounds per square inch. Also, the sand grains are coated with an impermeable layer of metal that protects them from being dissolved by hot aqueous fluids.

For the most effective results it is desirable to flow a plurality of pore volumes (one pore volume is defined as the total volume of pore space contained in the total bulk volume of sand to be consolidated before consolidation) of both the activator solution and the basic metal-plating solution through the interval of the formation into which the well is opened and preferably flow pore volumes of each of said solutions through generally shaped zones, e.g., cylindrical or spherical zones having a diameter of from about 1 to about 5 feet around perforated portions of a cased well borehole.

The results of effecting a chemical-reduction deposition of metal within a porous earth formation that surrounds the borehole of a well are such that this is a particularly advantageous process for treating such an earth formation. Where the earth formation is unconsolidated, the metal deposition provides a method of consolidation in which the chemical costs are no more than those of sand consolidation procedures which have proven to be economically advantageous. Where the well is to be employed in the injection or production of hot fluids, the metal depositions provides a treatment that (a) consolidates any unconsolidated portions of the earth formation; (b) metal plates any siliceous components and prevents the dissolution of silica that tends to occur whenever a hot aqueous fluid is flowed through a siliceous earth formation that was naturally consolidated or was consolidated by a conventional sand-consolidation procedure; (c) metal plates and improves the stability of any intergranular bonding material that has been formed within the earth formation; and (d) reduces the heat loss that occurs within the tubing string of production wells that extend into communication with the earth formation by depositing on the tubing strings a reflective metal plating that reduces the thermal emissivity of the tubing string.

In general, a chemical-reduction deposition of metal within a porous mass of earth-formation material is an advantageous procedure for improving the strength and stability of the mass. The electrodes metal-deposition treatment provides a convenient and relatively economical procedure for binding a sand into a mold in which to solidify a molten material, such as a molten metal, for increasing the thermal or electrical conductivity of a mass of earth-formation material or for dispersing and fixing metals that are to be utilized as catalysts, activators, property indicators, or the like, within such a porous mass, etc.

PREFERRED EMBODIMENT OF THE INVENTION

The process of metal plating unconsolidated earth formations into consolidated form can be effected by the following sequential steps for consolidating a zone around a borehole:

Sand formation consolidation at temperature below 125° F.

(1) inject if necessary an acidizing fluid such as a mud acid and thereafter wash the formation with several pore volumes of a solvent such as isopropyl alcohol to achieve the desired injection rate;

(2) preflush the formation also if necessary or desirable with conventional liquids such as several volumes of hydrocarbon oil, e.g., diesel oil, pore and/or solvent such as isopropyl alcohol;

(3) inject activator solutions which are capable of activating or catalyzing the sand grains such as a colloidal palladium solution;

(4) inject a basic metal plating solution;

(5) inject a spacer fluid which is preferably an ammonical buffer solution which is preferred for cobalt metalization; and (6) inject water to displace the last pore volume of the previous flush.

In permeating a porous mass by the process of the present invention with an activator or catalytic liquid, each element of the mass is preferably contacted with at least several pore volumes of the liquid. Solutions containing palladium or stannous-activators can also contain therein reducing agents such as hydrozine or sodium hypophosphate or lower aledhyde, e.g., formaldehyde. Such activator solutions can be palladium chloride and/or stannous chloride solutions or corresponding bromide, nitrate or sulfate solutions or preferably an acidic aqueous palladium chloride-hydrazine solution. Other such activator fluids can be aqueous solutions containing gold, ruthenium, rhodium, platinum or any of the so-called metallic dehydrogenation catalysts and a reducing agent such as hydrazine with or without the presence of protective colloids, e.g., soluble gums such as gum arabic; proteins, e.g., gelatin, albumin, starch, glucosides or the like. The pH of the activator solution should be in the range of 3–5 and can be controlled by the presence of weaker acids such as formic or acetic acids and salts thereof and mixtures thereof.

The formation can be preheated with a mud acid (410 cc. concentrated HCl+590 cc. $H_2O$+32 grams $NH_4F$+2 cc. amine corrosion inhibitor) or any suitable acidizing fluids such as described in U.S. Patents 3,215,199; 3,236,-305; 3,249,536 and 3,251,415.

The activator liquid may be displaced prior to injecting the basic metal plating solution by an inert fluid, for example, by air where the liquid is drained from a mold, or by a liquid containing a reducing agent or by pure water. In treating a subsurface earth formation it is preferable to precede the above steps by a conventional oil- and connate-water-displacing procedure such as described in U.S. Patent 3,294,166 for sand consolidation with epoxy resin. Since this procedure generally displaces oil and connate-water films from the tubing string, such a pretreatment ensures that some metal deposition will occur in the injection tubing string when the metal-deposition solution is injected into the treated porous mass through said tubing string in the well bore in communication wtih the porous mass, and therefore some thermal-emissivity reduction can be provided in respect to the thermal properties of the tubing string.

The basic metal-containing solution can be in the pH range of 8–14, preferably 8–10. The pH regulators can be aqueous ammonical solutions containing ammonium hydroxide, ammonium chloride and mixtures thereof. Regulation and control of the pH of the solution is essential in controlling the reaction rate of metal plating so as to prevent heavy metal deposition at the inlet face of the formations to be consolidated. Also, by this means more uniform metal deposition through the formation is accomplished and to greater depths. The reaction rate of metal deposition on the surfaces to be consolidated is most effective when the pH of the solution is about 8 or 9 and the temperature is in the range of from about 35° F. to about 125° F.

The metal-plating compound can be a polyvalent metal compound of which preferred compounds include nickel, cobalt, copper and iron compounds and mixtures thereof, e.g., nickel and/or cobalt chloride and/or sulfate. These metal compounds are reduced by such reagents as hypophosphorous acid, hypophosphites, e.g., sodium hypophosphite or alkaline solution of molybdenate, formate and/or hydroxy carboxylates, e.g., hydroxy-acetate. The concentration of the metal-containing compounds and the reducing agents in aqueous solutions can be varied over a wide range such as from 1 to 50%, respectively, and preferably from 5 to 40% each.

To keep the hydrogen evolution to a minimum during the reaction, the reducing agents in the metal-plating solutions should be kept at a minimum, generally not in excess of 10% of the stoichiometric amount of total metal in the electroless metal-plating solution. Also, hydrogen evolution can be effectively suppressed and the life of the metal-plating reaction increased by addition to such aqueous solutions buffering and chelating agents such as hydroxy carboxylic acids and polycarboxylic acids and their salts, e.g., citric, tartaric, maleic, gluconic, succinic acids or ammonium or alkali metal salts of said acids such as sodium citrate, sodium succinate and the like. However, the gas can be effectively eliminated from the area being metalized by applying pressure of 200 pounds or more on the system.

To promote wetting of the surfaces to be metalized by the electroless process of the present invention, wetting agents can be used such as reaction products of alkylphenol and alkylene oxide, e.g., nonyl phenol ethylene oxide reaction product wherein the number of ethylene oxide units in the molecule ranges from 4 to 20; sulfated alcohols, sulfonate of fatty acids having from 12 to 18 carbon atoms, e.g., sulfonated oleic acid, sulfonated mineral oil fractions and the like.

Also, when using hypophosphites as the reducing agent their concentration should be controlled since depending in part on the phosphorus content of the solution the metal being plated can be in the form of an alloy of metal-phosphorus nickel phosphide. High concentrations of hypophosphite, such as above 10% of the stoichiometric amount needed to react with the total metal in the plating solution, tend to form these alloys.

The basic metal-plating consolidation process of the present invention can be also used to improve earth formations which have been previously consolidated by various resins or plastics such as epoxy resins or various other types by forming on the resin coated surface a metal coating that renders the consolidated formation resistant to hydrolysis at elevated temperatures, such as those encountered when hot water and/or steam is injected into such systems for secondary recovery of hydrocarbon fluids such as petroleum oil. The metalization of resin or plastic consolidated formations is effectively accomplished by the process of the present invention. This is particularly desirable in cases where resins used to consolidate formations are thermally stable but are hydrolytically unstable and tend to disintegrate on prolonged exposure to steam or hot water. The same applies to formations consolidated with quartz or other types of consolidators.

To illustrate the use of metal plating in sand consolidation the following illustrative examples are set forth.

EXAMPLE I

Coarse sand, Midway Sunset Field, Calif., shallow depth (1,000 ft.)

Conditions (1) Formation temperature, 95° F.
(2) Absolute pressure, 600 p.s.i.
(3) Injection rate during plating, 1.4 pore volumes/minute.
(4) Time of plating, 105 minutes.
(5) Sand from well cores used after removal of residual oil and water.

Procedure (1) The oil-free dry sand was packed in a small pipe nipple and connected to a pump. Temperature was controlled by a water bath and a back pressure valve maintained a pressure on the system of 600 p.s.i. All air was removed from the system by flowing alcohol and water through the sand pack.

(2) The sand was activated by flowing about 10 pore volumes of the following activating solution through the sand pack:

(a) 919 cc. water
(b) 81 cc. gum arabic solution containing 0.4 gram/l. gum arabic
(c) 0.4 cc. hydrazine hydrate (85% solution)
(d) 1.0 cc. of a solution containing:

1.6 grams $PdCl_2$
10 cc. conc. HCl
90 cc. water (e) Sufficient glacial acetic acid to give pH=4.2 (usually 1 to 3 cc.). The amount of activator required depends on the surface area of the sand and must be empirically determined for each different type of sand to be consolidated.

(3) To separate the plating solution from the activating solution above a spacer was used. This may be 1 or 2 pore volumes of water or a dilute (by a factor of 10) solution of the activator solution above.

(4) Consolidation was achieved by flowing approximately 150 pore volumes of the following nickel plating solution through the activated sand:

(a) 81.6 cc. $H_2O$
(b) 3.62 grams $NiCl_2 \cdot 6H_2O$
(c) 4.33 grams $NaH_2PO_2 \cdot H_2O$
(d) 5.95 grams $NH_4Cl$
(e) 4.75 grams (5.0 cc.) 29.4% w. $NH_3$ solution (conc. ammonium hydroxide)

Results

The sand in the pipe nipple was well consolidated having about 6,000 p.s.i. compressive strength at the inlet.

EXAMPLE II

Fine sand, West Lake Verret, La., shallow depth (1,000 ft.)

Conditions (1) Formation temperature, 78° F.
(2) Absolute pressure, 600 p.s.i.
(3) Injection rate during plating, 1.7 pore volumes/minute
(4) Time of plating=100 minutes
(5) Bailed sands Procedure (1) Same as (1) above under Procedure.
(2) Same as (2) above under Procedure but all solutes were four times more concentrated except glacial acetic acid which is added to give pH=4.2 as before.
(3) Same as (3) above under Procedure but dilution was by a factor of 40 if water was not used.
(4) Nickel plating was initated by flowing 4 to 5 pore volumes of the following solution:

(a) 835 cc./l. $H_2O$
(b) 38 grams/l. $NiCl_2 \cdot 6H_2O$
(c) 45.6 grams/l. $NaH_2PO_2 \cdot H_2O$
(d) 62.5 grams/l. $NH_4Cl$
(e) 52.2 cc./l. 29.4% w. $NH_3$ (conc. ammonium hydroxide solution)

(f) 80 grams/l. sodium citrate·2H$_2$O (5) Consolidation was achieved by flowing about 170 pore volumes of the following solution through the activated and initiated sand:
  (a) 856 cc./l. H$_2$O
  (b) 38 grams/l. CoCl$_2$·6H$_2$O
  (c) 33 grams/l. NaH$_2$PO$_2$·H$_2$O
  (d) 62.5 grams/l. NH$_3$Cl
  (e) 52.2 cc./l. 29.4% w. (NH$_3$ (conc. ammonium hydroxide solution)

(6) Final flush was injected using about 5 pore volumes of the following solution:
  (a) 905 cc./l. H$_2$O
  (b) 66 grams/l. NH$_4$Cl
  (c) 55 cc./l. 29.4 w. NH$_3$ (conc. ammonium hydroxide solution)

Results

The sand was consolidated in the same manner as described in Example I above.

Other useful electroless basic metal plating solutions are shown in Table 1.

metal in solution has been found to have a significant effect on plating rate as noted below:

TABLE 3

| Composition | Metal | °F. | $R_k$[1] |
|---|---|---|---|
| II | Ni | 90 | 3.4 |
| IV | Co | 90 | 0.62 |

[1] $R_k = w/ct$: where $w$ = thickness of deposit at time ($t$) and $c$ = concentration.

Under the conditions indicated, the cobalt solution reacts about 1/16 as rapidly as the corresponding nickel solution. Other metal systems such as iron and iron-nickel alloys can be used.

A number of consolidated sand samples have been exposed to flowing hot water in the 400° to 600° F. range. The results are given in Table 4.

TABLE 4
Hot Water Resistance of Consolidated Sand (A) NICKEL

| Sand | Consolidation on Control Sample | | | After Hot Water Exposure of Test Sample | | | |
|---|---|---|---|---|---|---|---|
| | Composition | T, °F. | Comp. Str.,[1] p.s.i. | Time, days | T, °F. | Bulk Density[2] | Comp. Str.,[1] p.s.i. |
| No. 5 Blasting Sand | II | 93 | 4,240 | 10 | 420 | | 3,400 |

(B) COBALT

| Sand | Composition | T, °F. | Comp. Str.,[1] p.s.i. | Time, days | T, °F. | Bulk Density[2] | Comp. Str.,[1] p.s.i. |
|---|---|---|---|---|---|---|---|
| 1 part No. 5 Sand, 3 parts WLVB. | X | 84 | 4,500 | 10 | 565 | | 810 |
| No. 5 | IV | 131 | 2,800 | 3 | 565 | | 2,630 |

[1] Approximately middle of consolidated zone.
[2] Bulk density: Unconsolidated sand=1.65; Consolidated sand=2.2 (indicates about 20% of pore space filled with Ni).

Notable features of the present invention are the control of the reaction rate of the electroless metal process so that greater depths of consolidation are achieved and also the metal plating process aids in reducing corrosion and heat loss of tubing strings used in the bore wells for

TABLE 1.—PLATING SOLUTIONS

| | I | II | III | IV | V | VI | VII | VIII | IX | X |
|---|---|---|---|---|---|---|---|---|---|---|
| H$_2$O, cc./l. (gal./bbl.) | 721 (30.3) | 858 (36.0) | 835 (35.1) | 856 (36.0) | 905 (38.0) | 797 | 721 | Solvent | 860 | 831 |
| NiCl$_2$·6H$_2$O, grams/l. (lb./bbl.) | 76.5 (26.8) | 37.9 (13.3) | 38 (13.3) | | | 28.2 | 76.5 | 30 | | |
| CoCl$_2$·6H$_2$O, grams/l. (lb./bbl.) | | | | 38 (13.3) | | | | | 38 | 38 |
| NaH$_2$PO$_2$·H$_2$O, grams/l. (lb./bbl.) | 92 (32.2) | 45.5 (15.9) | 45.6 (15.9) | 33 (11.6) | | 33.9 | 92.0 | 10 | 45.6 | 33 |
| NH$_4$Cl, grams/l. (lb./bbl.) | 126.5 (44.3) | 62.5 (21.9) | 62.5 (21.9) | 62.5 (21.9) | 66 (23.1) | 46.5 | 126.5 | | 62.5 | 62.5 |
| Conc NH$_4$OH (29.4% NH$_3$), cc./l. (gal./bbl.) | 105 (4.41) | 52.1 (2.19) | 52.2 (2.19) | 52 (2.18) | 55 (2.31) | 117 | 105 | | 52.2 | 52 |
| Na Citrate·2H$_2$O, grams/l. (lb./bbl.) | | | 80 (28.0) | | | 77.5 | | | | |
| Na Acetate·3H$_2$O, grams/l. (lb./bbl.) | | | | | | | | | 38 | |
| 2-ethoxyethanol | | | | | | | | | | 25 |
| pH | | 8.5 | 8.5 | 8.9 | 8.7 | 9.3 | 9.8 | 8.5 | 7.05 | 8.7 |
| Density, grams/cc. (lb./gal.) | 1.11 (9.2) | 1.07 (8.9) | | 1.04 (8.7) | | 1.11 | 1.07 | | 8.7 | |

Conversion factors: 1 gram/l.=0.35052 lb/bbl.; 1 cc./l.=0.042 gal./bbl.

Nickel and cobalt systems using compositions II and IV and IX, respectively, were used to consolidate No. 5 blasting sand and mixtures thereof with bailed sand from the West Lake Verret Field (WLVB), La., and its compressive strength in p.s.i. after consolidation was as follows:

TABLE 2
Compressive Strength for Sand Consolidated with Ni and Co Systems

Ni SYSTEM

| Compositions | Number of Pore Volume used | Flow Rate, Pore Volume/min. | °F. | Sand | Inlet (p.s.i.) Observed |
|---|---|---|---|---|---|
| II | 2.4 | 2.1 | 90 | No. 5 Blasting Sand | 14,000 |
| II | 208 | 2.0 | 88 | do | 11,000 |

Co SYSTEM

| Compositions | Number of Pore Volume used | Flow Rate, Pore Volume/min. | °F. | Sand | Inlet (p.s.i.) Observed |
|---|---|---|---|---|---|
| IX | 232 | 2.3 | 81 | 1 part No. 5; 3 parts WLVB. | 7,200 |
| IV | 127 | 2.1 | 81 | 1 part No. 5, 3 parts WLVB. | 4,900 |
| IV | 82 | 13.4 | 124 | 1 part No. 5, 3 parts WLVB. | 13,500 |

To successfully consolidate various types of sandstones, the reaction constant, $R_k$, of the metal plating solution must be controlled to compensate for variations in temperature, pressure and sand surface area. The type of when injecting the binding and activating fluids into the underground production areas the tubing strings are metalized by the process of the present invention. As these fluids are injected into the loose formations the tubing strings are also metalized with such materials as nickel or cobalt or nickel phosphide or cobalt phosphide or nickel-iron protective metal coatings, as well as other parts of the equipment and apparatus with which said metalizing fluids come in contact.

I claim as my invention:
1. A method of consolidating at a controlled reaction rate an incompetent formation penetrated by a well, said formation having a temperature of less than about 125° F. comprising:
  (a) injecting through the well and into the formation an aqueous solution containing an activating agent capable of activating the surface of the incompetent formation;
  (b) injecting through the well and into said formation a basic aqueous solution containing a metal-plating compound and a reducing agent; and,
  (c) injecting said basic metal-plating containing solution in an amount sufficient to displace said activating agent solution and flow a plurality of pore volumes of basic metal-plating compound solution through the interval of said formation into which the well is opened to achieve substantial consolidation of the formation adjacent the borehole.

2. The method of claim 1 wherein the activating agent is a salt or colloidal metal compound selected from the group consisting of palladium, platinum, gold, ruthenium, rhodium and stannous chloride, bromide, nitrate and sulfate and mixtures thereof; the metal-plating compound is selected from the group consisting of nickel, cobalt, copper and iron compounds and mixtures thereof and the reducing agent is selected from the group consisting of hypophosphorus acid, alkali metal hypophosphite, alkali metal molybdenate, a lower aldehyde and mixtures thereof and the metal plating solution is made basic by the presence of an ammonium or alkali compound.

3. The method of claim 1 wherein the basic metal plating is accomplished within an incompetent formation having a temperature between 35° F. and 125° F.

4. The method of claim 1 wherein prior to injecting the activating and metal plating solutions, a solvent or acidizing solution or mixtures thereof are injected into the incompetent formation to sweep oil and connate water therefrom.

5. The method of claim 1 wherein the pH of the activating solution (a) is between 3 and 5.

6. A method of consolidating an incompetent formation having reservoir temperature not greater than 125° F and penetrated by a borehole of a well comprising:
 (a) injecting through a tubing string of the well and into the incompetent formation an aqueous solution containing a small amount of palladium chloride and a reducing agent;
 (b) injecting through a tubing string of the well an ammonical aqueous solution of nickel chloride and sodium hypophosphite at a temperature of between 35° F. and 125° F; and,
 (c) injecting enough of said nickel plating compound solution to displace said activating agent solution and flow a plurality of pore volumes of the nickel-plating compound solution through the interval of said formation into which the well is opened to achieve consolidation.

7. The method of claim 6 wherein the nickel chloride solution is made basic by addition of ammonium chloride.

8. The method of claim 6 wherein prior to injecting solutions (a) and (b) into the incompetent formation, an acidizing fluid and solvent are injected into the formation.

9. The method of claim 8 wherein the solutions (a) and (b) are separated by a spacer fluid.

10. The method of claim 6 wherein the pH of the activating solution (a) is between 3 and 5.

References Cited
UNITED STATES PATENTS

| | | | |
|---|---|---|---|
| 2,118,669 | 5/1938 | Grebe | 166—21 X |
| 2,238,930 | 4/1941 | Chamberlain et al. | |
| 2,690,402 | 9/1954 | Crehan | 117—54 X |
| 2,872,312 | 2/1959 | Eisenberg | 117—54 X |
| 3,342,262 | 9/1967 | King et al. | 166—29 |

CHARLES E. O'CONNELL, Primary Examiner.

IAN A. CALVERT, Assistant Examiner.

U.S. Cl. X.R.

166—300; 117—54